United States Patent
Yao

(10) Patent No.: US 9,304,811 B2
(45) Date of Patent: Apr. 5, 2016

(54) METHODS AND SYSTEMS TO IDENTIFY AND MIGRATE THREADS AMONG SYSTEM NODES BASED ON SYSTEM PERFORMANCE METRICS

(75) Inventor: Jin Yao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 13/994,574

(22) PCT Filed: Jun. 29, 2012

(86) PCT No.: PCT/CN2012/077921
§ 371 (c)(1),
(2), (4) Date: Jun. 14, 2013

(87) PCT Pub. No.: WO2014/000274
PCT Pub. Date: Jan. 3, 2014

(65) Prior Publication Data
US 2014/0143781 A1    May 22, 2014

(51) Int. Cl.
G06F 9/46 (2006.01)
G06F 9/48 (2006.01)
(52) U.S. Cl.
CPC ............. *G06F 9/4856* (2013.01); *Y02B 60/144* (2013.01); *Y02B 60/162* (2013.01)
(58) Field of Classification Search
None
See application file for complete search history.

(56) References Cited

U.S. PATENT DOCUMENTS

| | | | |
|---|---|---|---|
| 5,860,116 A * | 1/1999 | Washington | 711/148 |
| 2003/0069920 A1* | 4/2003 | Melvin et al. | 709/108 |
| 2005/0160424 A1 | 7/2005 | Broussard et al. | |
| 2007/0079298 A1 | 4/2007 | Tian et al. | |
| 2009/0193414 A1* | 7/2009 | Broussard et al. | 718/1 |
| 2009/0327609 A1* | 12/2009 | Fleming et al. | 711/118 |
| 2011/0307903 A1* | 12/2011 | Vaddagiri | 718/105 |
| 2011/0314225 A1* | 12/2011 | Nishihara et al. | 711/119 |
| 2012/0054466 A1* | 3/2012 | Devendran et al. | 711/207 |
| 2013/0191610 A1* | 7/2013 | Burka et al. | 711/206 |

OTHER PUBLICATIONS

International Searching Authority, "Written Opinion", issued in connection with PCT application No. PCT/CN2012/077921, mailed Mar. 28, 2013 (4 pages).
International Searching Authority, "International Search Report", issued in connection with PCT application No. PCT/CN2012/077921, mailed Mar. 28, 2013 (3 pages).

(Continued)

*Primary Examiner* — Adam Lee
(74) *Attorney, Agent, or Firm* — Hanley, Flight & Zimmerman, LLC

(57) ABSTRACT

Methods and systems to identify and migrate threads among system nodes based on system performance metrics. An example method disclosed herein includes sampling a performance metric of a computer program thread, the computer program thread executing on a home node of a computer system having multiple nodes, and determining whether the performance metric exceeds a threshold value. The method also includes identifying a remote node associated with a remote memory if the threshold value is exceeded, the remote memory being accessed by the computer program thread, and identifying the computer program thread as a candidate for migration from the home node to the remote node if the threshold value is exceeded. In this way, a computer program thread that frequently accesses a remote memory can be migrated from a home node to a remote node associated with the remote memory to reduce the latency associated with memory accesses performed by the computer program thread and thereby improve system performance.

25 Claims, 10 Drawing Sheets

(56) References Cited

OTHER PUBLICATIONS

"Intel Microarchitecture Codename Nehalem Performance Monitoring Unit Programming Guide (Nehalem Core PMU)", Intel Corporation, 2010, (59 pages).

"Intel Microarchitecture Codename Nehalem Performance Monitoring Unit Programming Guide (Nehalem Core PMU)", submitted Oct. 11, 2010, retrieved from <http://software.intel.com/en-us/articles/intel-microarchitecture-codename-nehalem-performance-monitoring-unit-programming-guide-core> on Jun. 7, 2013 (3 pages).

* cited by examiner

FIG. 4

MEMORY INTENSIVE THREAD LIST — 323

| CPUID | THREAD ID | LLCMISS | LMA | RMA |
|---|---|---|---|---|
| | | | | |
| | | | | |
| | | | | |
| | | | | |
| | | | | |

FIG. 5

CANDIDATE MIGRATION LIST — 346

| THREADID | REMOTE NODE | LOCAL NODE | LMA | RMA | AVG. LATENCY |
|---|---|---|---|---|---|
| | | | | | |
| | | | | | |
| | | | | | |
| | | | | | |

METHODS AND SYSTEMS TO IDENTIFY AND MIGRATE THREADS AMONG SYSTEM NODES BASED ON SYSTEM PERFORMANCE METRICS

FIELD OF THE DISCLOSURE

This disclosure relates generally to operating system schedulers and more particularly methods and systems to identify and migrate threads among system nodes on system performance metrics.

BACKGROUND

Many modern day computer systems have a Non-Uniform Memory Access (NUMA) memory design in which memory access times (latency values) depend on the location of a memory relative to a processor that accesses that memory. Such systems often include one or more nodes on which processors operate to execute one or more of program threads. An operating system scheduler of a NUMA based system assigns (or schedules) each of the program threads to execute on a corresponding one of the processors. A node to which a thread is assigned is the home node for that thread and a thread executing on the processor associated with the home node may access memory both local to and remote from the home node. A memory that is local to the home node (a "local memory") is associated with the home node whereas a memory that is remote to the home node (a "remote memory") is associated with a node other than the home node (a "remote node").

In NUMA-based systems, a processor operating on the home node is able to access the local memory faster than the processor is typically able to access the remote memory. Thus, remote memory accesses result in higher memory access latency values which negatively affect system performance. As a result, a system scheduler may to schedule the threads to execute on a node that minimizes the remote memory accesses to be performed by that thread. For example, threads that only access one memory may be assigned/scheduled to execute on the processor associated with the node on which that memory resides. Some operating system schedulers perform affinity-based scheduling in which a thread executed on a node is thereafter determined to have an affinity to that node and continues to be executed on that home node during future executions of the thread, even though the thread may experience poor performance due to high latency values.

Other operating system schedulers are designed to perform thread dependent co-scheduling in which two threads that operate in a co-dependent manner and that share a same memory are scheduled to operate on a same home node on which the shared memory is located. However, in many cases, the operating system scheduler is unable to determine which of numerous threads are co-dependent and share memory. Thus, existing thread-scheduling methods used by operating system schedulers associated with NUMA-based systems are often inefficient and negatively impact the performance of the operating system.

BRIEF DESCRIPTION OF THE DRAWINGS

FIG. 4 is an illustration of an example memory intensive thread list.

FIG. 5 is an illustration of an example migration candidate list.

DETAILED DESCRIPTION

Example apparatus, methods and systems described herein can improve computer system performance by providing an operating system scheduler with hints obtained from the system hardware to identify threads that are likely to experience lower latency times if migrated from a home node to another node. The hints can include, for example, system performance metrics that reflect an aspect of the performance level of the system and that can be used to identify a new home node for a given thread. In some examples, the system performance metrics can be based on memory accesses performed within the system, and, in some examples, the system performance metrics can be based on system power metrics based on load balancing performed by the system or power consumption related performance. In addition, the methods and systems enable an operating system scheduler to determine a node on which a thread is running, a node on which a thread is accessing memory, a number of memory accesses being performed by a thread and an average latency value associated with the memory accesses. The scheduler uses this information to identify a thread(s) that accesses a remote memory(ies) more frequently than a local memory, to determine the remote node(s) associated with the remote memory(ies), and to identify the thread(s) as a candidate for migration to the remote node.

Figure 1:
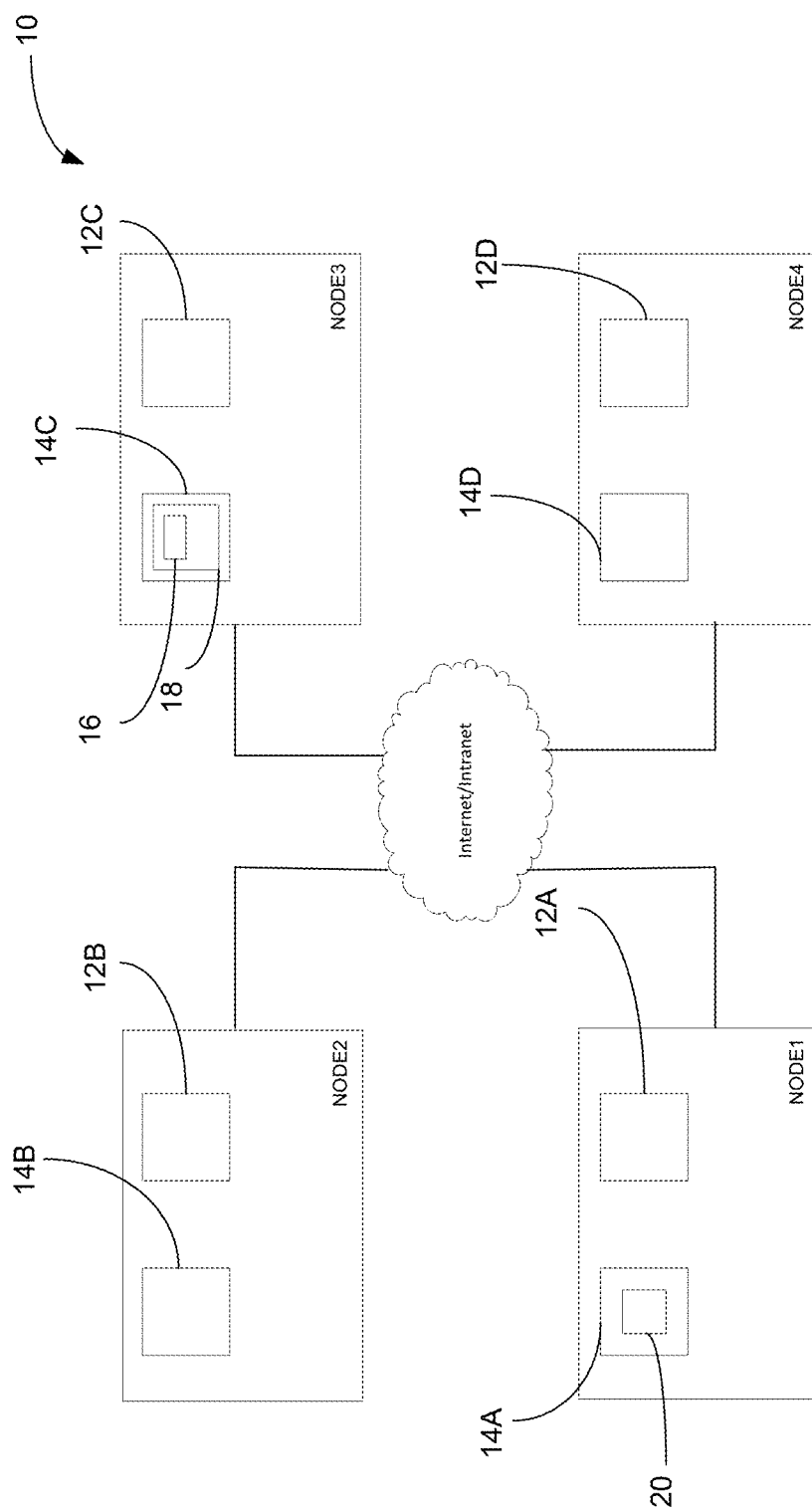
FIG. 1 is block diagram of an example multi-node computer system having example nodes that are associated with one or more example processors and memories.

A block diagram of an example computer system 10 having a NUMA based design is illustrated in FIG. 1. The example computer system 10 OF FIG. 1 includes NODE1, NODE2, NODE3, and NODE4. However, any number of system nodes may operate on the example computer system 10, without limitation. The example system nodes, NODE1-NODE4 are communicatively coupled via wired and/or wireless connections and are each associated with one or more processors 12A, 12B, 12C and 12D and one or more memories 14A, 14B, 14C and 14D. An operating system scheduler 16 of an operating system 18 resides on one of the four nodes, for example, NODE3 and assigns one of the processors 12A, 12B, 12C or 12D to execute a computer program thread 20. Although, the example operating system 18 may reside on any of the four nodes, NODE1-NODE4, for illustrative purposes, the example operating system 18 described herein resides on NODE3. For illustrative purposes only, the thread 20 in this example is assigned to the processor 12A associated with NODE1, and NODE1 is referred to as the home node for the thread 20. Example thread 20 can access the local memory 14A associated with the home node, NODE1, and can access any of the remote memories associated with any of the remote nodes, NODE2, NODE3 or NODE4 (e.g., a node other than the home node).

The system 10 in which the example scheduler 16 can be implemented in systems having a heterogeneous NUMA architecture (e.g. an architecture typically including multiple processors, such as, for example, general purpose CPUs, that are the same or similar in terms of instruction set size, throughput and power consumption) as well as systems having an asymmetrical NUMA architecture (e.g., an architecture typically including processors of different processing capability). An asymmetrical architecture may have, for example, a general purpose CPU having significant processing power combined with many integrated cores (MICs) having a more limited instruction set, lower power consumption and lower throughput. In some examples, the example scheduler can be implemented in systems having a single chip combination of Itanium architecture (IA) cores with graphics and non-IA cores (e.g., graphics processing units (GPUs)). One example of such a single chip combination system is a Broadwell-Gen8 having a shared virtual memory where the heterogeneity/asymmetry is exposed to the example scheduler 16.

Further, the functionality and/or intelligence of the example scheduler 16 disclosed herein can be implemented on/applicable to different processors of the same system including, for example, a GPU architected global microcontroller that is dedicated to scheduling the Graphics EUs and Media engines. In some examples, the example scheduler 16 is implemented at the operating system kernel level and one or more of the data structures described herein (see FIGS. 2 and 3) can be implemented using an internal kernel data structure.

Figure 2:
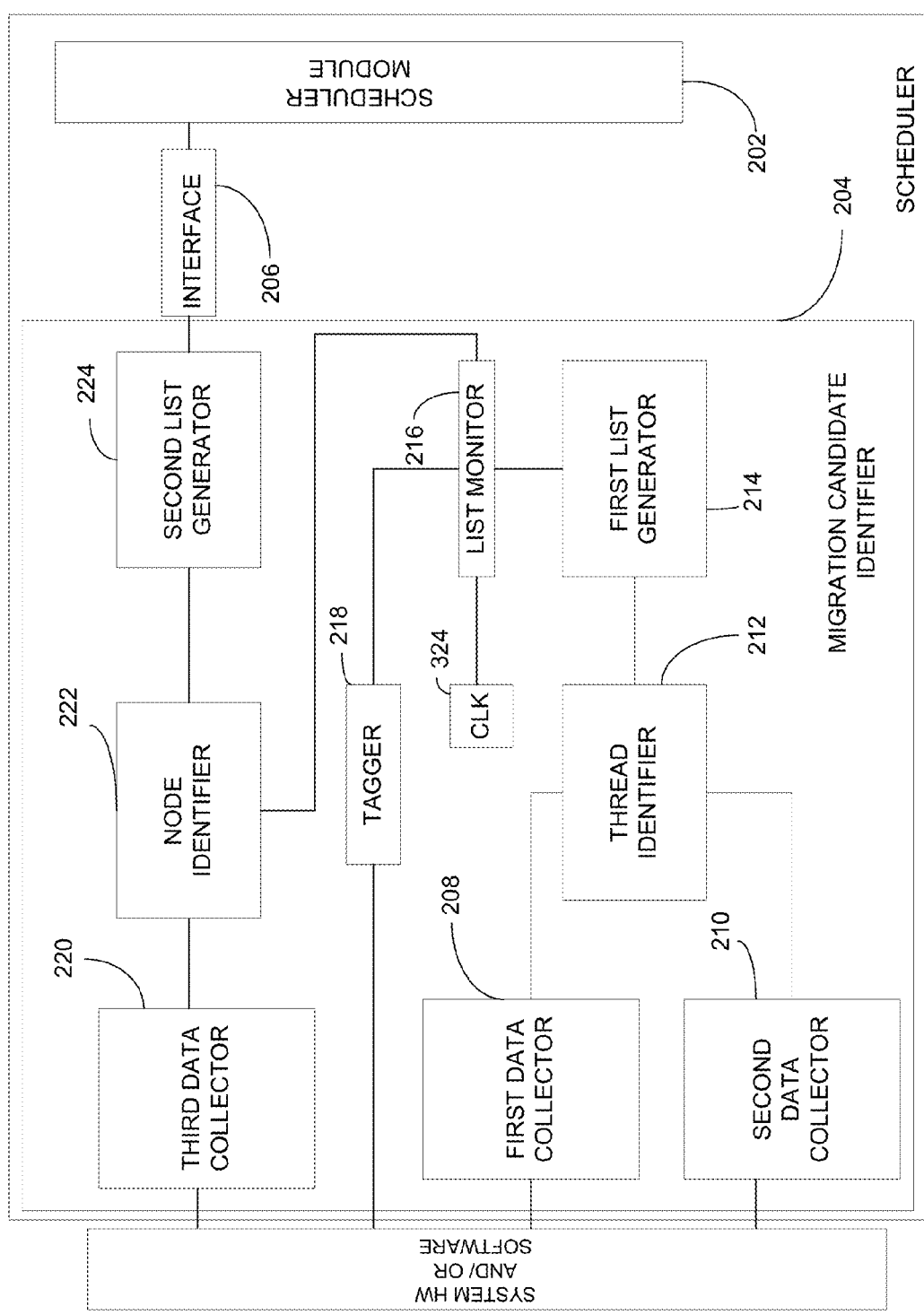
FIG. 2 illustrates an example scheduler of the computer system of FIG. 1 having an example migration candidate identifier, communicatively coupled to an example scheduler module via an example interface.

A block diagram of the example scheduler 16 of FIG. 1 having an example scheduling module 202 coupled to an example migration candidate identifier 204 via an example interface 206 is illustrated in FIG. 2. The example migration candidate identifier 204 identifies memory intensive threads that frequently access one or memories associated with one or more nodes that are remote to the home node on which each of the respective threads are executing. Memory intensive threads, remote memories frequently accessed by the memory intensive threads, and the nodes associated with the remote memories (i.e., "remote nodes") may be identified, via the example interface 206, to the example scheduling module 202 for possible migration to one of the identified remote nodes. In some examples, the migration of any of the threads may depend on any number of factors in addition to the identification of the thread as a memory intensive thread as described below.

Referring still to the illustrated example of FIG. 2, the migration candidate identifier 204 includes a first data collector 208, a second data collector 210, a thread identifier 212, a first list generator 214, a list monitor 216, a tagger 218 (the "tagger"), a third data collector 220, a node identifier 222, and a second list generator 224. In operation, the example thread identifier 212 uses performance metrics data captured by the example first data collector 208 and thread identifying data captured by the example second data collector 210 to identify threads that are memory intensive with respect to a remote memory (i.e., threads that frequently access memory and that access a respective remote memory(ies) more frequently than a respective local memory). Such memory intensive threads may experience poor performance due to the greater latency times typically associated with accessing a remote memory. The memory intensive/poorly performing threads are identified to an example first list generator 214 for inclusion in a list of memory intensive threads. The example list monitor 216 monitors the list of memory intensive threads to identify the threads that persist/remain on the memory intensive thread list for at least a threshold amount of time as measured by a CPU clock 324 (see FIG. 3). The persistently memory intensive threads are identified to the example node identifier 222, which causes the example third data collector 220 to collect node information from tagged memory load operations associated with the memory intensive threads. The tagged memory load operations are each tagged by the example tagger 218 to carry node information and latency information associated with the respective tagged memory load operation. The example node identifier 222 uses the node information to identify the remote nodes on which the memory(ies) being accessed by the persistently memory intensive threads are located and supplies a list of the persistently memory intensive threads and information identifying the corresponding remote memory(ies) and node(s) to the example second list generator 224. The example second list generator 224 compiles the information supplied by the example node identifier 222 into an example migration candidate list 346 (see FIG. 3) and transmits or otherwise causes the example migration candidate list 346 (see FIG. 3) to be transmitted to the example scheduler module 202 via the example interface 206. The example scheduler module 202 determines whether one or more of the migration candidates will be migrated and proceeds to migrate one or more of the migration candidates based on the determination. In some examples, the inclusion of a thread on the example migration candidate list 346 (see FIG. 3) is one of any number of factors used by the example scheduler module 202 to determine whether a thread will be migrated to another node. In some examples, the other factors considered by the example scheduler module 202 may include, for example, whether the destination node has sufficient processing resources, cache warmth (i.e., whether a thread's data is still in cache), whether a dispatch queue of a processor being considered as a migration destination is too long, etc.

Figure 3:
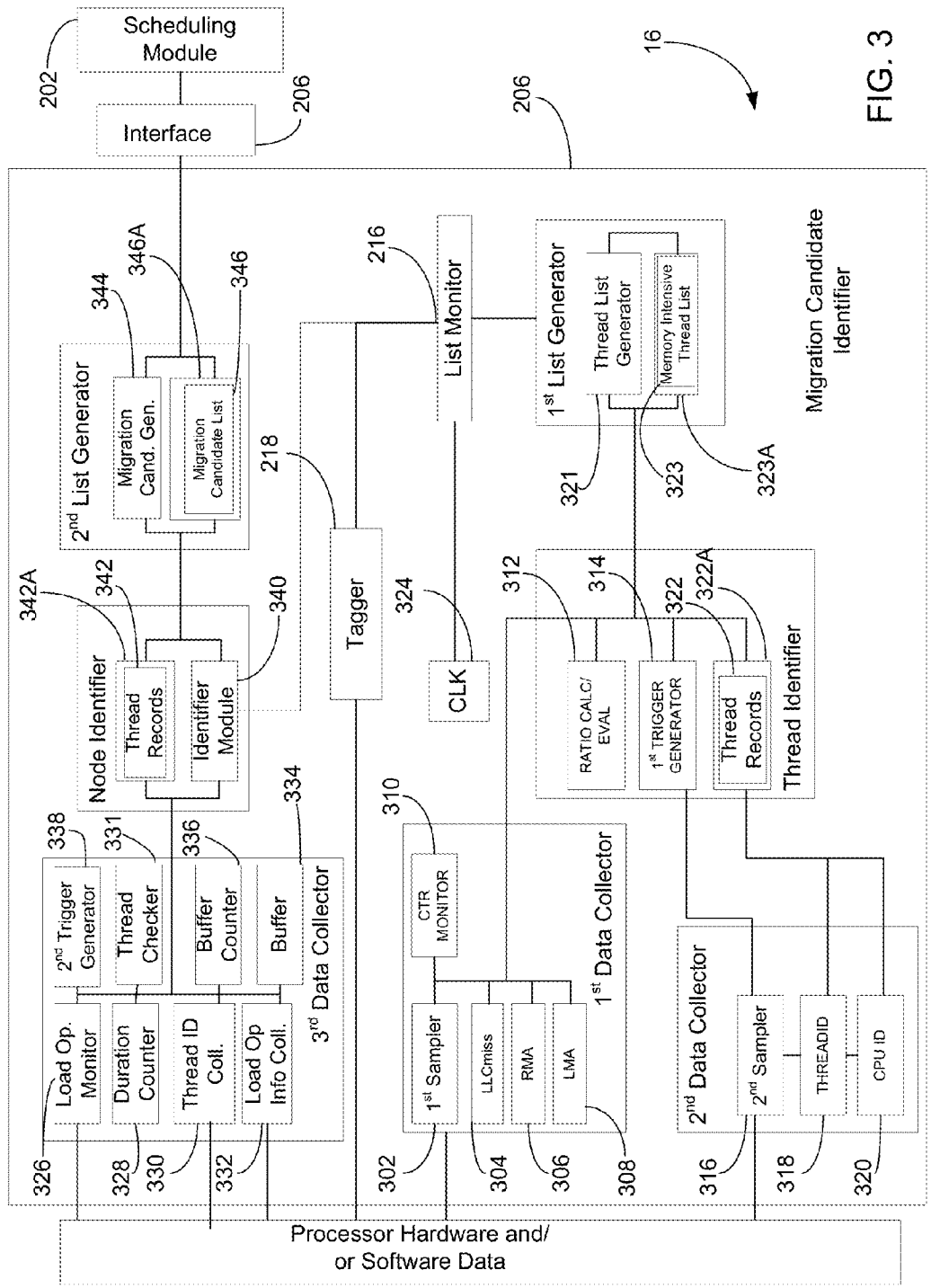
FIG. 3 is a block diagram of the example migration candidate identifier of FIG. 2.

Example components that can be used to perform the operations disclosed above with respect to FIGS. 1 and 2 are illustrated in FIG. 3. In some examples, the example first data collector 208 includes an example first sampler 302 that samples example performance metrics data for storage in an example set of counters including, an example LLCmiss (low-level cache miss) counter 304 ("LLCmiss counter"), an example remote memory access counter 306 ("RMA counter") and an example local memory access counter 308 ("LMA counter"). The example performance metrics data can include example memory access data associated with, for example, a plurality of threads, including the thread 20 (see FIG. 1), that each operate/execute on a respective home node such as, for example, the home node, NODE1. The example memory access data includes, for example, a number of times a thread experiences an LLCmiss ("LLCmiss data"), a number of times the thread accesses a remote memory ("RMA data"), and a number of times the thread accesses a local memory ("LMA data"). The sampled LLCmiss data, the sampled RMA data, and the sampled LMA data are stored in the example LLCmiss counter 304, the example RMA counter 306, and the example LMA counter 308, respectively. In some examples, the example LLCmiss counter 304, the example RMA counter 306, and the example LMA counter 308 are implemented using special purpose registers built into the processor executing the thread 20 that can be programmed or otherwise set to sample desired thread execution data. For example, the special purpose registers may be hardware performance counters commonly installed in microprocessors that can be programmed for use in monitoring any number of events occurring during operation of the microprocessor. Such hardware performance counters are often used to conduct performance analysis and/or tuning. In some examples, the example processor 14C may include an interface that provides a program—visible instruction set for use in selecting a performance event(s), (e.g., counter overflow) to be monitored and collected and selecting a performance monitoring register(s) to be used to store the monitored performance metrics. In some examples, the processor 14C may include an interface that provides a program-visible instruction set for use in programming new performance events to be monitored, (e.g.) performance events not directed to memory access events but instead directed to other system events.

An example counter monitor 310 monitors the contents of each of the example LLCmiss counter 304, the example RMA counter 306, and the example LMA counter 308 and notifies an example ratio calculator/evaluator 312 of the example thread identifier 212 when the contents of each of the counters 304, 306 and 308 have exceeded a respective threshold value. The example threshold values for the example LLCmiss counter 304, example RMA counter 306, and the example LMA counter 308 may be set to any desired value. In some examples, the example threshold values may be set to identify not only the number of memory accesses but also a rate at which the memory accesses occur. For example, the threshold values associated with the example LLCmiss counter 304, example RMA counter 306 and example LMA counter 308 may each be set to 1 million memory accesses per second. In some examples, the threshold value of any of the counters may differ from the threshold value of the other counters.

Referring still to FIG. 3, in response to the notification supplied by the counter monitor 310, the example ratio calculator/evaluator 312 calculates and evaluates a ratio of the number of remote memory accesses stored in example RMA counter 306 to the number of local memory accesses stored in the example LMA counter 308. The ratio threshold value may be set to, for example, 0.5, and represents a number that, if exceeded, indicates that the associated thread has performed a sufficient number of remote memory accesses relative to local memory accesses to identify the thread as being a possible candidate for migration/relocation. As described above, any thread that qualifies as a possible candidate for migration is a thread that is likely to experience lower latency times if relocated from its home node to the remote node on which the remote memory frequently being accessed by the thread is located. Although, in this example, the performance metrics being monitored include the LLCmiss data, the RMA data, and the LMA data, any other performance data may instead be captured for use in identifying a memory intensive (otherwise poorly performing) thread.

If the calculated ratio has exceeded the ratio threshold value, and provided that the example LLCmiss, the example RMA and the example LMA threshold values have been exceeded, an example first trigger generator 314 of the example thread identifier 212 generates a first trigger signal. The first trigger signal causes an example second sampler 316 to collect thread identifying information of the thread that caused the trigger signal to be generated (e.g., the thread 20, also referred to as the "thread of interest"). The thread identifying information for the thread of interest 20, which may include, for example, a threadID and a CPU ID, are stored in an example set of memory buffers 318 and 320 in the example second data collector 210 and then transmitted for storage as a thread record 322 in an example thread record data structure 322A associated with the example thread identifier 212. In some examples, the example first trigger generator 314 can be an interrupt generator that generates an interrupt causing the operating system to temporarily halt execution of the thread of interest 20 and an interrupt handler may cause the thread identifying information to be collected while the execution of the thread of interest 20 is halted. The duration of time that the thread of interest 20 is halted may be set to any value, such as, for example, a value that limits the impact of the interrupt on the operating system. After the duration of time has elapsed, the operating system resumes executing the thread of interest 20 and the example thread identifier 212 causes the contents of the example thread record data structure 322A and the contents of the example LLCmiss counter 304, the example RMA counter 306 and the example LMA counters 308 to be transmitted to the example first list generator 214. An example thread list generator 321 of the example first list generator 214 uses the transmitted information to create an entry in an example memory intensive thread list 323 (also illustrated in FIG. 4) contained in an example memory intensive thread list data structure 323A. As illustrated in FIG. 4, one example memory intensive thread list 323 can include the CPU ID, the theadID, and the contents of the LLCmiss, LMA and RMA counters for each entry in the list 323. The example memory intensive thread list data structure 323A may be any type of data structure and the memory intensive thread list 323 may be formatted in any desirable manner.

In some examples, the example first data collectors 208 and the example second data collector 210 can be implemented using hardware performance monitors installed in standard processors. Such hardware performance monitors provide counters that can be programmed to monitor processor events. The counters can be used to trigger an interrupt upon overflow. The events selected for monitoring can be selected via a software interface.

Referring still to FIG. 3, the example list monitor 216 monitors the example memory intensive thread list 323 and the CPU clock 324 to identify threads that remain on the memory intensive thread list 323 for a threshold number of clock cycles as being "persistently memory intensive threads." Here, for illustrative purposes, the thread of interest 20 is a persistently memory intensive thread. In some examples, the example list monitor 216 causes the threads in the memory intensive thread list to be sorted in descending order by the number of CPU clock cycles that each memory intensive thread remains on the memory intensive thread list 323. In such examples, the first "N" entries in the memory intensive thread list 323 are identified as the persistently memory intensive threads, where N represents any desired value. In some examples, the example list monitor 216 causes entries associated with non-persistent threads to be removed from the memory intensive thread list 323.

The example list monitor 216 transmits or otherwise causes the list of persistently memory intensive threads to be transmitted to the example node identifier 222 for use in identifying the node(s) being accessed by each of the persistently memory intensive threads. In some examples, an example identifier module 340 of the example node identifier 222 selects one of the persistently memory intensive threads for monitoring to identify the node(s) being accessed by the selected persistently memory intensive thread. Here, for illustrative purposes, the thread of interest 20 is selected for monitoring. To identify the node(s) being accessed by the thread of interest 20, the example node identifier 222 causes the example third data collector 220 to sample memory load operations system wide. Because the thread of interest 20 has been identified as being memory intensive, it generates a significant number of load operations and is likely to be sampled by the third data collector 220. Prior to sampling, a randomly selected set of the load operations performed by the operating system are tagged by the tagger 218 to carry node identifying information and latency information. The example tagger 218 can randomly tag, for example, one percent of all or a subset of the memory load operations. As described in greater detail below, the example node identifying information can be used to identify the remote node on which the remote memory being accessed by the thread of interest 20 is located and the latency information represents the duration of time required to execute the tagged memory load operations being accessed by the thread of interest 20.

To collect the node identifying information and latency information associated with the thread of interest 20, a load operation monitor 326 of the example third data collector 220 samples the memory load operations being executed by the example operating system 18 and identifies the sampled memory load operations that are tagged. An example duration counter 328 of the example third data collector 220 monitors the execution time of each of the sampled, tagged memory load operations. When a sampled, tagged memory load operation takes more than a threshold duration of time (e.g., 100 CPU cycles) to execute, the example duration counter 328 is decremented. In some examples, the example duration counter 328 is set to a value of 1,000. If the value in the example duration counter 328 reaches zero, the node identifying information and the latency information data carried by the sampled, tagged memory load operation are collected by an example load operation information collector 332 and stored as a record in an example data structure such as, for example, an example hardware buffer 334. In some examples, the node identifying information can include a data linear address and data source encoding information, both corresponding to the tagged memory load operation from which the node identifying information was collected.

When a storage limit (e.g., 100 records) of the example hardware buffer 334 as determined by an example buffer counter 336 is reached, the stored buffer records are saved as example node records 342 in an example node record data structure 342A accessible to the example node identifier 222. In some examples, when the storage limit of the example hardware buffer 334 is reached, the example second trigger generator 338 generates a trigger signal that causes the example operating system 18 to halt execution of the currently operating thread for a duration of time sufficient to permit an example threadID collector 330 to collect thread identifying information such as a threadID and a CPU ID, associated with the currently operating thread. If an example thread checker 331 of the example third data collector 220 determines that the collected thread identifying information identifies a persistently memory intensive thread, such as the thread of interest 20, the records of the hardware buffer 336 are stored in the example node record data structure 342A and are identified as being associated with the thread of interest 20. Note that this sampling approach is a profiling approach that may result in associating some of the sampled, tagged memory load operations with the execution of the currently operating thread, such as the thread of interest 20, when, in fact, such sampled, tagged memory load operations are not associated with execution of the thread of interest 20. Despite this fact, the profiling approach described here is generally useful in accurately identifying one or more remote nodes being accessed by the thread of interest 20 or any of the other persistently memory intensive threads.

After the buffer records of the hardware buffer 336 have been saved as node records 342 in the node record data structure 342A and the associated thread identifying information has been collected, the hardware buffer 336 is cleared. If the collected thread identifying information does not identify a persistently memory intensive thread, such as the thread of interest 20, then the records of the hardware buffer 336 are cleared without storing the records in the node record data structure 342A of the example node identifier 222. In some examples, the records of the hardware buffer 336 may automatically be saved to the node record data structure 342A but then later discarded if the thread identifying information does not identify a persistently memory intensive thread, such as the thread of interest 20.

After the duration of time has elapsed such that the thread identifying information has been collected, the example operating system 18 resumes execution of the currently operating thread, such as the thread of interest 20. In some examples, the example second trigger generator 338 generates an interrupt and an interrupt handler causes the thread identifying information to be collected and, in some instances, the records of the hardware buffer 336 to be transferred to the node record data structure 342A. In some examples, the duration of the interrupt is set to a value that limits the impact of the interrupt on the example operating system 18.

In some examples, a first hook and a second hook are used to ensure proper operation of the example duration counter 328 after the interrupt has caused the example operating system 18 to halt execution of the selected persistently memory intensive thread. The first hook causes the contents of the example duration counter 328 to be stored to a temporary storage location before the persistently memory intensive thread is halted and the second hook causes the contents of the temporary storage to be restored to the example duration counter 328 after the example operating system 18 causes execution of the selected persistently memory intensive thread to resume. Thus, any changes to the example duration counter 328 caused by memory load operations that are associated with other threads that continue to execute while the thread of interest 20 is halted are disregarded when the thread of interest 20 resumes execution.

In some examples, the example third data collector 220 can be implemented using the Intel® Precise Event Based Sampling (PEBS) facility installed in Intel processors. The PEBS facility provides counters configurable to monitor microprocessor events. Upon overflow of the counter(s), machine state information is captured in a buffer record, a process referred to as a PEBS assist. The machine state information captured during a PEBS assist includes, at least, a data linear address, a data source (identifiable from data source encoding information) and a latency value. When a buffer containing the PEBS records is full, an interrupt is generated and the contents of the PEBS buffer are saved elsewhere. For detail regarding the PEBS facility, the interested reader is referred to the Intel Programming Guide "Intel Microarchitecture Codename Nehalem Performance Monitoring Unit Programming Guide (Nehalem Core PMU)," copyright 2010, Intel Corporation.

The example identifier module 340 of the example node identifier 222 accesses the node records 342 in the example node record data structure 342A and uses the data linear address associated with each record to determine a target address for the load operation corresponding to each record. The target address of a load operation represents the memory address to which the data subject to the load operation (the "load data") is stored. The example identifier module 340 can then use the target address to identify the remote node associated with the remote memory being accessed by the selected persistently memory intensive thread (e.g., the thread of interest 20) when performing the corresponding load operation. In such examples, the example identifier module 340 of the example node identifier 222 determines the mapped physical pages associated with each data linear address and then identifies the target node associated with the physical pages. In this manner, the remote (or target node) node associated with the remote memory being accessed by the selected memory intensive thread is determined.

In addition to identifying the node associated with each example node record 342 in the example node record data structure 342A, the example identifier module 340 of the example node identifier 222 can also use all of the latency values associated with the load operations to calculate an average latency value that is also stored in the example node record data structure 342A. In some examples, the average latency value can instead be calculated by the example migration candidate list generator 224 instead of, or in addition, to the example node identifier 222. In some examples, the example identifier module 340 uses the data source encoding information captured and stored as a part of the load operation buffer records stored in buffer 334 to determine a source of the data that is subject to the load operation.

The example node identifier 222 supplies the node records 342 stored in the example node record data structure 342A to the example second list generator 224 which includes the information in a list of example migration candidate threads 346 (illustrated in FIG. 5) stored in an example migration candidate data structure 346A. As illustrated in FIG. 5, the entries in the example candidate migration thread list 346 can identify the threadID, the remote node, the local node, the LMA and RMA data and the average latency for the load operations collected by the third data collector 220. Here, the local node can be determined using the CPU ID associated with the threadID. In some examples, all or most of the load operations performed by the selected persistently memory intensive thread are targeted to a same remote memory located at a same remote node. In such a case, the persistently memory intensive thread is a candidate for migration to the remote node being targeted by all or most of the load operations. In other examples, some of the load operations performed by the selected persistently memory intensive thread are targeted to one remote memory located at one of the remote nodes and others of the load operations are targeted to another remote memory located at another of the remote nodes. In such a case, the persistently memory intensive thread is a candidate for migration to either of the target nodes. In some examples, when a selected persistently memory intensive thread accesses two or more remote nodes during execution, the remote node that is accessed a greater number of times may be the more desirable migration destination for the persistently memory intensive thread. In some examples, when both a first remote node and a second remote node are targeted by the selected persistently memory intensive thread, an example migration candidate thread generator 344 may calculate an average latency value for the operations targeted to the first remote node and calculate an average latency value for the operations targeted to the second remote node. In such an example, the node associated with the highest average latency value may be the more desirable migration destination for the selected persistently memory intensive thread. In some examples, both the number of load operations directed to a remote node and the average latency value associated with a remote node may be used to determine which of the remote nodes is a more desirable migration destination for the selected persistently memory intensive thread. In some examples any number of factors associated with the data communicated to the example second list generator 224 may be used to identify which of two or more nodes is a more desirable migration destination for a persistently memory intensive thread.

In some examples, the example migration candidate thread generator 344 of the example second list generator 224 determines which of several remote nodes is the more desirable migration destination in the manner described above and, in some examples, the example scheduler module 202 makes this determination. In some examples, the example second list generator 224 may identify all or a subset of remote nodes accessed by a thread as possible migration destinations to the example scheduler module 202 which may use the information to determine which of the remote nodes will become the destination for the selected persistently memory intensive thread.

The example second list generator 224 communicates the example migration candidate thread list 346 to the example scheduler module 202 via the example interface 206. The example scheduler module 202 uses the example migration candidate thread list 346 to identify each of the threads that will be migrated and the corresponding remote nodes to which each of the identified threads will be migrated. In some examples, the example scheduler module 202 uses other factors, in addition to the inclusion of a given thread on the example migration candidate thread list 346 to determine whether the subject thread will be migrated as described above.

When a remote node has been identified as the migration destination for a thread, the example scheduler module 202 defines the remote node as the "preferred node" for that thread. The example scheduler module 202 will attempt to dispatch or migrate the thread to the preferred node at the runtime of the thread (i.e., before the thread is executed a second time, the scheduler migrates the thread to the identified remote node). If there are not enough resources in the preferred node because, for example, too many other threads are waiting in the dispatch queue of the preferred home node, then the example scheduler module 202 may choose an alternative node as the migration destination for the thread. The example scheduler module 202 may select the new destination node using, for example, the migration candidate list 346 or the node records 342. Defining a node as a preferred node to which a thread may be assigned. A scheduling method that includes defining the remote node as a preferred node is also referred to as a "soft migration" in that the thread may or may not be assigned to the preferred node based on a variety of factors.

In some examples, the sampling window during which the first data collector 208 samples the memory access information and the sampling window during which the example third data collector 220 samples the tagged memory load operations are periodically opened and closed to thereby limit the overhead caused by the sampling. In addition, the interval between two adjacent sampling windows may be selected to further lessen the impact on the performance of the operating system 18. In some examples, the overhead caused by sampling the memory load operations is further reduced by collecting only data associated with the memory load operations of the top N persistently memory intensive threads.

In some examples, the example third data collector 220 continues to collect buffer records until a number of records sufficient to identify a candidate destination node for the thread to be migrated. For example, the example third data collector 220 may collect 100 buffer records, 128 buffer records or any other desired number of buffer records. In some examples, after a potential migration destination(s) has been identified for a persistently memory intensive thread, the example node identifier 222 and/or the example second list generator 224 uses other data collected at the example third data collector 220 to identify a potential migration candidate for another of the persistently memory intensive threads. In some examples, the various components/modules of the migration candidate identifier 204 operate simultaneously to continuously identify persistently memory intensive threads, to collect load operation data associated with those threads, and to identify candidate migration destinations for each such thread.

In some examples, power metrics counters/monitors may replace or supplement the performance metrics counters. In such an example, one or more of the first, second and example third data collectors 208, 210 and 220 are configured to monitor the power being used by a node executing a given thread(s) in an attempt to lower the overall power consumption being exhibited by the system or to otherwise balance the power load across the system nodes. Such an example system is advantageously used in any system in which power availability is a challenge including, for example, systems associated with mobile devices such as System on a Chip (SoC) devices (e.g. tablets, laptops, mobile telephones, video games, etc.). In some examples, the example scheduler 16 can use memory access or power consumption metrics to perform on scheduling on any NUMA computer system whether associated with a mobile device computer system (including those identified above) or associated with a non-mobile system such as, for example, an enterprise-wide computer system. In some examples, one or more of the nodes of the computer system 10 operate on a mobile device.

While examples of the example scheduler 16 have been illustrated in FIGS. 1, 2, and 3, one or more of the elements, processes and/or devices illustrated in FIGS. 1-3 may be combined, divided, re-arranged, omitted, eliminated and/or implemented in any other way. Further, any or all of the example scheduler 16, the example scheduler module 202, the example migration candidate identifier 204, the example interface 206, the example first data collector 208, the example second data collector 210, the example thread identifier 212, the example first list generator 214, the example list monitor 216, the example tagger 218, the example third data collector 220, the example node identifier 222, the example second list generator 224, the example first data sampler 302, the example LLCmiss counter 304, the example RMA counter 306, the example LMA counter 308, the example second data sampler 316, the example threadID buffer 318, the example CPU ID buffer 320, the example ratio calculator/evaluator 312, the example first trigger generator 314, the example thread record data structure 322A containing the thread records 322, the example thread list generator 321, the example memory intensive thread data structure 323A containing the memory intensive thread list 323, the example list monitor 216, the example tagger 218, the example clock 324, the example load operation monitor 326, the example duration counter 328, the example threadID collector 330, the example load operation information collector 332, the example second trigger generator 338, the example thread checker 331, the example buffer counter 336, the example buffer 334, the example node record data structure 342A containing the node records 342, the example identifier module 340, the example migration candidate generator 344, and the example migration candidate data structure 346A containing the example migration candidate list 346 may be implemented by hardware, software, firmware and/or any combination of hardware, software and/or firmware. Thus, for example, any of the example scheduler 16, the example scheduler module 202, the example migration candidate identifier 204, the example interface 206, the example first data collector 208, the example second data collector 210, the example thread identifier 212, the example first list generator 214, the example list monitor 216, the example tagger 218, the example third data collector 220, the example node identifier 222, the example second list generator 224, the example first data sampler 302, the example LLCmiss counter 304, the example RMA counter 306, the example LMA counter 308, the example second data sampler 316, the example threadID buffer 318, the example CPU ID buffer 320, the example ratio calculator/evaluator 312, the example first trigger generator 314, the example thread record data structure 322A containing the thread records 322, the example thread list generator 321, the example memory intensive thread list data structure 323A containing the memory intensive thread list 323, the example list monitor 216, the example tagger 218, the example clock 324, the example load operation monitor 326, the example duration counter 328, the example threadID collector 330, the example load operation information collector 332, the example second trigger generator 338, the example thread checker 331, the example buffer counter 336, the example buffer 334, the example node record data structure 342A containing the node records 342, the example identifier module 340, the example migration candidate generator 344, and the example migration candidate data structure 346A containing the example migration candidate list 346 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus claims of this patent are read to cover a purely software and/or firmware implementation, at least one of the example scheduler 16, the example scheduler module 202, the example migration candidate identifier 204, the example interface 206, the example first data collector 208, the example second data collector 210, the example thread identifier 212, the example first list generator 214, the example list monitor 216, the example tagger 218, the example third data collector 220, the example node identifier 222, the example second list generator 224, the example first data sampler 302, the example LLCmiss counter 304, the example RMA counter 306, the example LMA counter 308, the example second data sampler 316, the example threadID buffer 318, the example CPU ID buffer 320, the example ratio calculator/evaluator 312, the example first trigger generator 314, the example thread record data structure 322A containing the thread records 322, the example thread list generator 321, the example memory intensive thread list data structure 323A containing the memory intensive thread list 323, the example list monitor 216, the example tagger 218, the example clock 324, the example load operation monitor 326, the example duration counter 328, the example threadID collector 330, the example load operation information collector 332, the example second trigger generator 338, the example thread checker 331, the example buffer counter 336, the example buffer 334, the example data node record structure 342A containing the node records 342, the example identifier module 340, the example migration candidate generator 344, and the example migration candidate data structure 346A containing the example migration candidate list are hereby expressly defined to include a tangible computer readable medium such as a (memory, digital versatile disk (DVD), compact disk (CD), etc.), storing such software and/or firmware. Further still, the example scheduler 16, the example scheduler module 202, the example migration candidate identifier 204, the example interface 206, the example first data collector 208, the example second data collector 210, the example thread identifier 212, the example first list generator 214, the example list monitor 216, the example tagger 218, the example third data collector 220, the example node identifier 222, the example second list generator 224, the example first data sampler 302, the example LLCmiss counter 304, the example RMA counter 306, the example LMA counter 308, the example second data sampler 316, the example threadID buffer 318, the example CPU ID buffer 320, the example ratio calculator/evaluator 312, the example first trigger generator 314, the example thread record data structure 322A containing the thread records 322, the example thread list generator 321, the example memory intensive thread list data structure 323A containing the memory intensive thread list 323, the example list monitor 216, the example tagger 218, the example clock 324, the example load operation monitor 326, the example duration counter 328, the example threadID collector 330, the example load operation information collector 332, the example second trigger generator 338, the example thread checker 331, the example buffer counter 336, the example buffer 334, the example node record data structure 342A containing the node records 342, the example identifier module 340, the example migration candidate generator 344, and the example migration candidate data structure 346A containing the example migration candidate list 346 of FIGS. 1, 2 and 3 may include one or more elements, processes and/or devices in addition to, or instead of, those illustrated in FIGS. 1, 2, and 3 and/or may include more than one of any or all of the illustrated elements, processes and devices.

Flowcharts representative of example machine readable instructions that may be executed to implement the example scheduler 16 of FIGS. 1-3 are shown in FIGS. 6, 7, 8, 9 and 10. In these examples, the machine readable instructions represented by each flowchart may comprise one or more programs for execution by a processor, such as the example processor 1112 shown in the example processing system 1100 discussed below in connection with FIG. 11. Alternatively, the entire program or programs and/or portions thereof implementing one or more of the processes represented by the flowcharts of FIGS. 6, 7, 8, 9 and 10 could be executed by a device other than the example processor 1112 (e.g., such as a controller and/or any other suitable device) and/or embodied in firmware or dedicated hardware (e.g., implemented by an ASIC, a PLD, an FPLD, discrete logic, etc.). Also, one or more of the blocks of the flowcharts of FIGS. 6, 7, 8, 9 and 10 may be implemented manually. Further, although the example machine readable instructions are described with reference to the flowcharts illustrated in FIGS. 6, 7, 8, 9 and 10 many other techniques for implementing the example methods and apparatus described herein may alternatively be used. For example, with reference to the flowcharts illustrated in FIGS. 6, 7, 8, 9 and 10, the order of execution of the blocks may be changed, and/or some of the blocks described may be changed, eliminated, combined and/or subdivided into multiple blocks.

As mentioned above, the example processes of FIGS. 6, 7, 8, 9 and 10 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6, 7, 8, 9 and 10 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory machine readable medium is expressly defined to include any type of machine readable storage medium and to exclude propagating signals. Also, as used herein, the terms "computer readable" and "machine readable" are considered equivalent unless indicated otherwise. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 6:
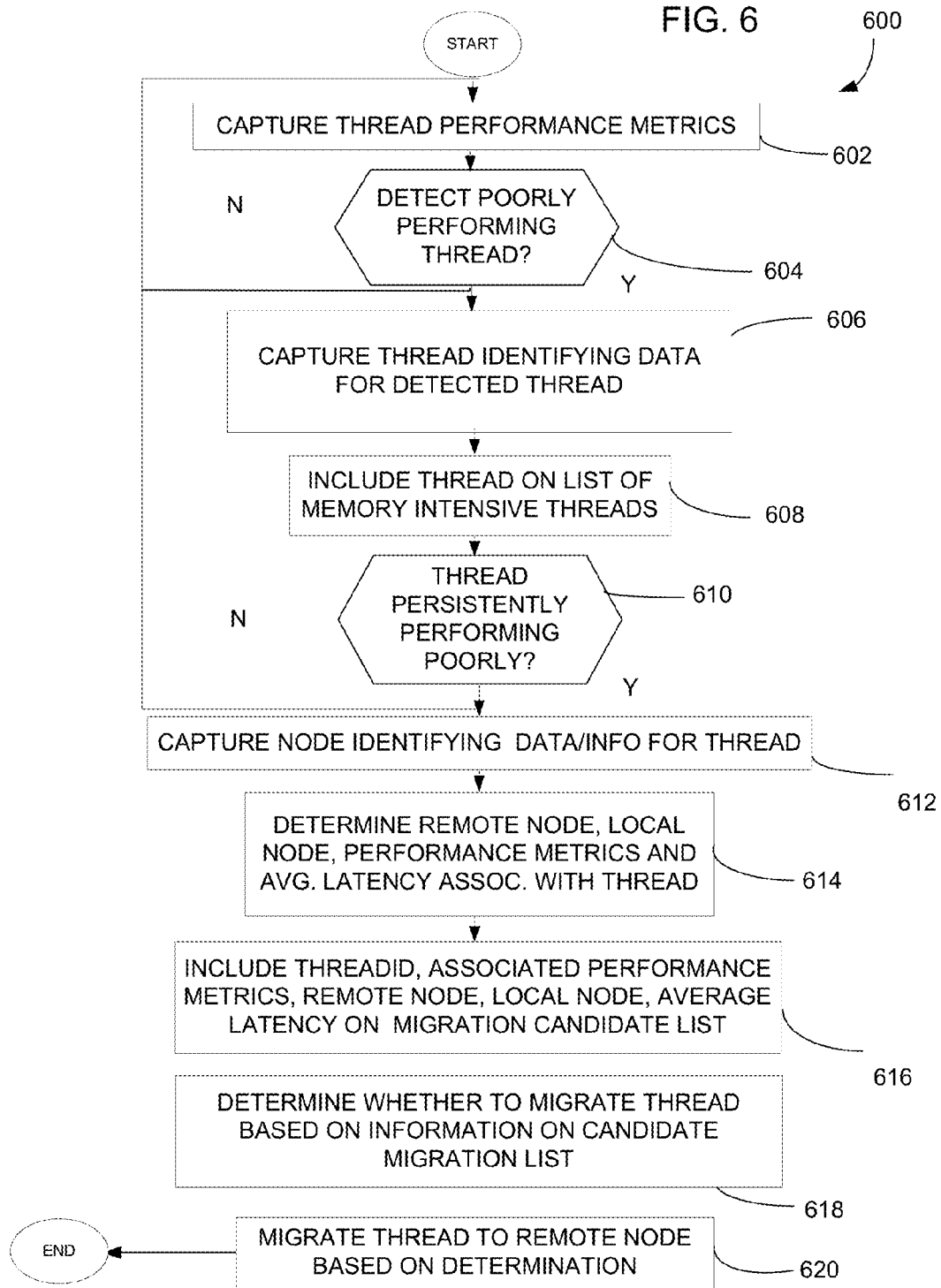
FIG. 6 is a flowchart representative of example machine readable instructions that may be executed to implement the example scheduler of FIG. 1 to identify a migration candidate thread.

Example machine readable instructions 600 that may be executed to implement the example scheduler 16 of FIG. 1 are represented by the flowchart shown in FIG. 6. The example machine readable instructions 600 may be executed at intervals (e.g., predetermined intervals), based on an occurrence of an event (e.g., a predetermined event), etc., or any combination thereof. The machine readable instructions 600 begin when thread performance metrics associated with a thread are captured/collected (block 602). As described above, the thread performance metrics are collected by the first data collector 208 using the set of example performance counters 304, 306, 308 and using the example ratio calculator/evaluator 312 of the example thread identifier 212 (see FIG. 3). If each of a set of threshold values associated with the contents of the performance counters and the ratio determined by the ratio calculator/evaluator 312, respectively, are exceeded, the thread is identified as exhibiting undesirable performance (e.g., unacceptably high latency values) based on the collected performance metrics (block 604). If the threshold values are not exceeded, thread performance metrics continue to be captured (block 602).

Thread identifying data/information associated with the memory intensive/poorly performing thread is captured (block 606) using, for example, the example second data collector 210 in the manner described with respect to FIG. 3. In some examples an interrupt of a duration sufficient to allow the second data collector 210 to capture the thread information is generated. The interrupt is generated, for example, when one or more of the performance metrics exceed their respective threshold value. The thread identifying information which can include a threadID and a CPU ID identifying the poorly performing thread and identifying the CPU on which the thread is being executed, respectively, is transferred from the example second data collector 210 to the example thread identifier 212 for storage in the example thread record data structure 322A containing the thread identifying records 322.

The collected performance metrics and thread information are transferred to an example list generator, such as, the example first list generator 214 for inclusion on a list of memory intensive threads (block 608). The memory intensive thread list is monitored by the example list monitor 216 to determine whether the thread is persistently performing poorly (block 610). If the thread is persistently performing poorly, node identifying information and latency information is captured for the poorly performing thread (block 612) using, for example, the example third data collector 220 in the manner described above with respect to FIG. 3. For example, an interrupt may be generated when the time required to execute each of a set of sampled load operations associated with the poorly performing thread exceeds a threshold value. During the interrupt, the node information for the poorly performing thread is collected from the sampled load operations. In some examples, the node identifying information includes a data linear address, data source encoding and a latency value. If the thread is not persistently performing poorly, the example first data collector 208 continues to sample data to identify another poorly performing thread (block 602). Assuming that a number of poorly performing threads are on the memory intensive thread list, the example list monitor 216 continues to monitor the memory intensive thread list for other threads on the list that are persistently performing poorly. In some examples, the example first data collector 208 continuously samples performance metrics to identify memory intensive threads that are then added to the example memory intensive thread list 323 stored in the example memory intensive thread list data structure 323A.

The node identifying information is used to identify the remote memory(ies) being accessed by the poorly performing thread and the node(s) on which the remote memory is located (block 614). The poorly performing thread and associated performance metrics, remote memory information and remote node information are then included on the list of migration candidate threads 346 (block 616). The list of migration candidate threads 346 is provided by the example second list generator 224 to the example scheduling module 202 for possible migration to the remote node associated with the remote memory (block 618). The example scheduling module 620 migrates the thread to the remote node (block 620) or executes a soft migration by placing the identified remote node as the preferred home node for the thread for possible migration (block 620) as described above.

As described above, the performance metrics collected for the poorly performing thread may include memory access information or power consumption information. In addition, capture of the node information associated with the poorly performing thread may be captured based on an amount of power consumed when executing a set of memory load operations instead of being collected based on the duration of the memory load operations.

Figure 7:
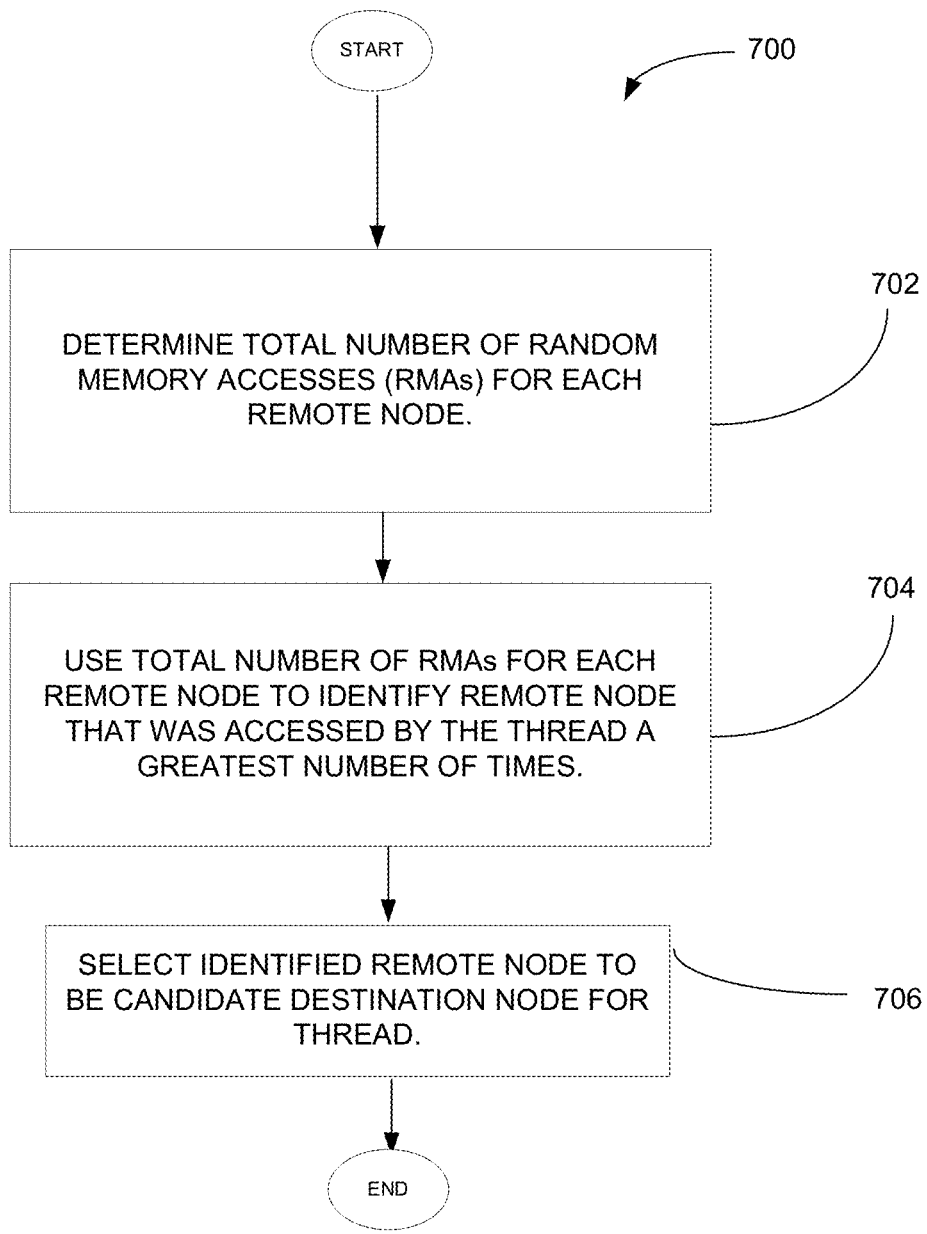
FIG. 7 is a flowchart representative of example machine readable instructions that may be executed to implement the example scheduler of FIG. 1 to select a remote node to which a thread is to be migrated.

Example machine readable instructions 700 that may be executed to implement the example scheduler 16 of FIG. 1 are represented by the flowchart shown in FIG. 7. The example machine readable instructions 700 may be executed at intervals (e.g., predetermined intervals), based on an occurrence of an event (e.g., a predetermined event), etc., or any combination thereof. The machine readable instructions 700 are used to determine how one of a plurality of remote nodes being accessed by a selected persistently memory intensive thread is selected as the destination node for the thread and begin when a total number of RMAs directed to each remote node (block 702) is calculated. The total number of RMAs for any given node is determined by adding the RMAs performed by the thread of interest on that remote node. The remote node having the highest total RMAs is identified (block 704) and selected to be the destination node for the thread (block 706). As described above, determining the total number of RMAs for each remote node (block 702), identifying the remote node having the highest number of RMAs (block 704) and selecting the identified remote node as the destination node for the thread (block 706) may be performed, for example, by the example second list generator 224 and/or by the example scheduler module 202.

Figure 8:
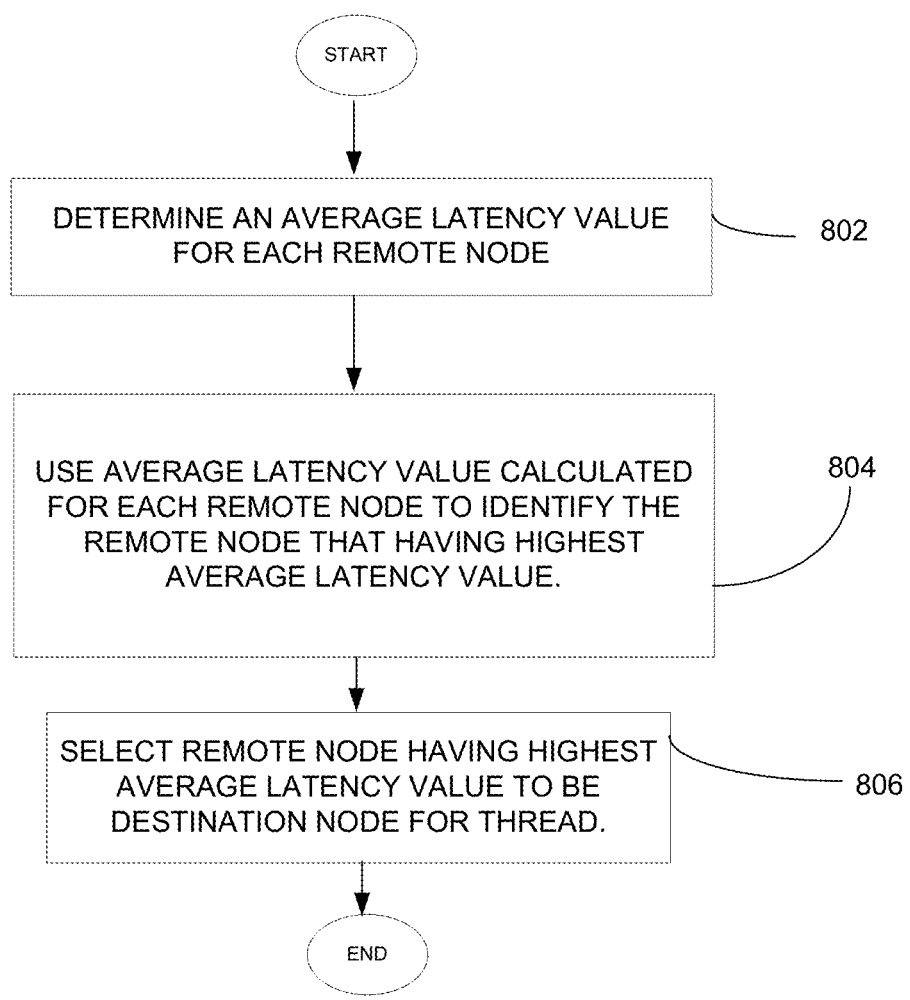
FIG. 8 is a flowchart representative of example machine readable instructions that may be executed to implement the example scheduler of FIG. 1 to select a remote node to which a thread is to be migrated.

Example machine readable instructions 800 that may be executed to implement the example scheduler 16 of FIG. 1 are represented by the flowchart shown in FIG. 8. The example machine readable instructions 800 may be executed at intervals (e.g., predetermined intervals), based on an occurrence of an event (e.g., a predetermined event), etc., or any combination thereof. The machine readable instructions 800 are used to determine how one of a plurality of remote nodes being accessed by a selected persistently memory intensive thread is selected as the destination node for the thread and begin when an average latency value is determined for each set of load operations directed to each remote node (block 802). The average latency value for each remote node may be calculated by, for example, adding the latency values for each RMA performed by the thread on the remote node and dividing the result by the total number of RMAs performed by the thread on the remote node. In some examples, the average latency value for any remote node may be calculated by, for example, adding the latency values for each of the RMAs and LMAs performed by the thread on the remote node and dividing the result by the total number of RMAs and LMAs performed by the thread on the remote node. The average latency value calculated for each remote node is used to identify the remote node associated with the highest latency value (block 804). The remote node with the highest average latency value is selected to be the destination node for the thread (block 806). As described above, the scheduler module 202 may perform a soft migration of the thread by identifying the remote node as the preferred home node for the thread. Then, depending on a variety of factors, the scheduler module 202 may migrate the thread to the preferred home node. If migration to the preferred home node is prohibited, another node may be selected as the preferred home node. The newly selected preferred home node may be selected from among the other remote nodes identified by the candidate migration identifier 204 or via other selection factors associated with conventional thread scheduling.

Figure 9:
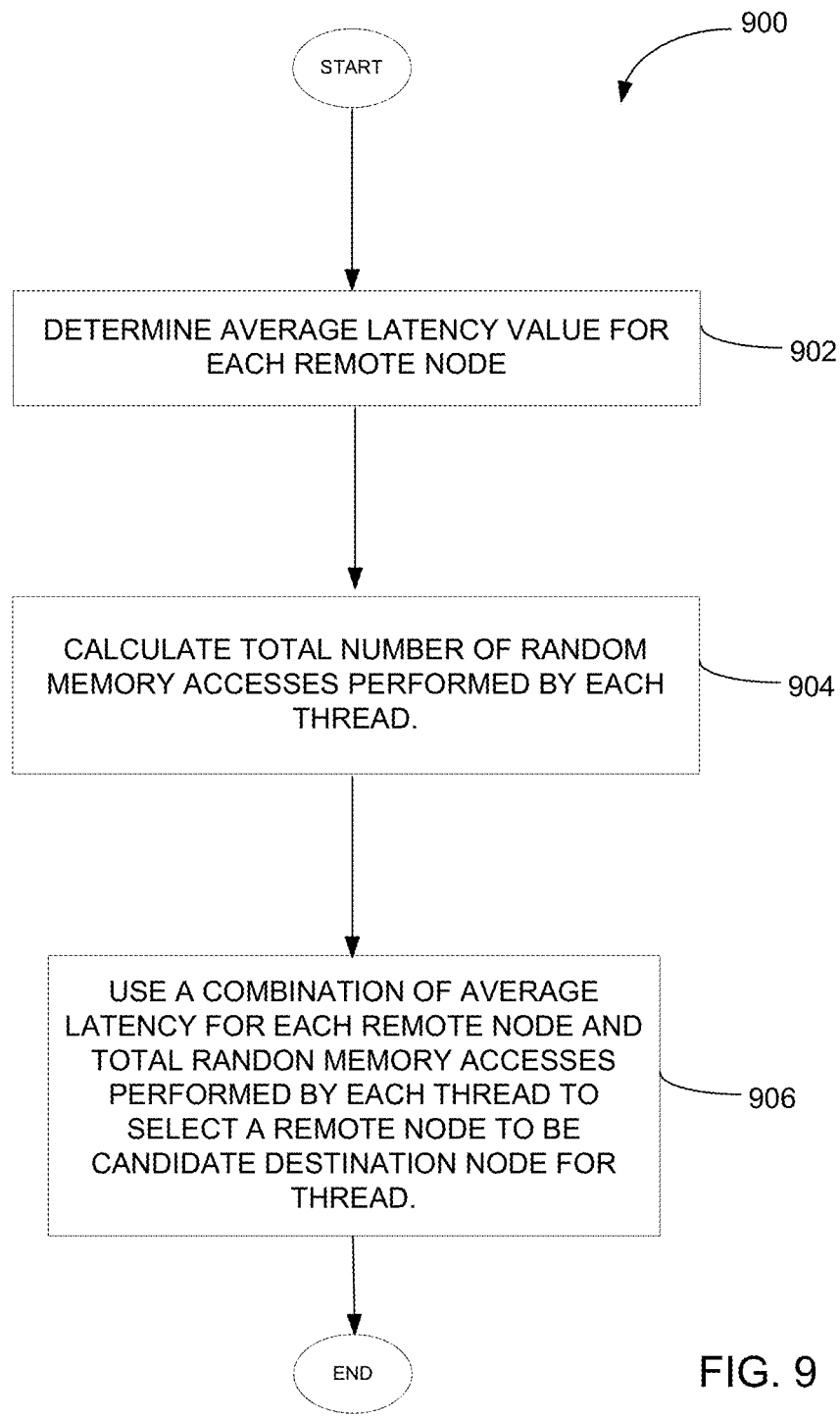
FIG. 9 is a flowchart representative of example machine readable instructions that may be executed to implement the example scheduler of FIG. 1 to select a remote node to which a thread is to be migrated.

Example machine readable instructions 900 that may be executed to implement the example scheduler 16 of FIG. 1 are represented by the flowchart shown in FIG. 9. The example machine readable instructions 900 may be executed at intervals (e.g., predetermined intervals), based on an occurrence of an event (e.g., a predetermined event), etc., or any combination thereof. The machine readable instructions 900 are used to determine how one of a plurality of remote nodes being accessed by a selected persistently memory intensive thread is selected as the destination node for the thread and begin when an average latency value is determined for each set of load operations that are directed to each remote node (block 902). A total number of RMAs is calculated for each remote node (block 904) and a combination of the average latency value of each remote node and the total number of RMAs of each remote node is used to select a remote node as the destination node for the thread (block 906). In some examples, the combination may include weighting either or both of the total number of RMAs of each remote node and the average latency value of each remote node and comparing the weighted values of each node to the weighted values of the other nodes.

Figure 10:
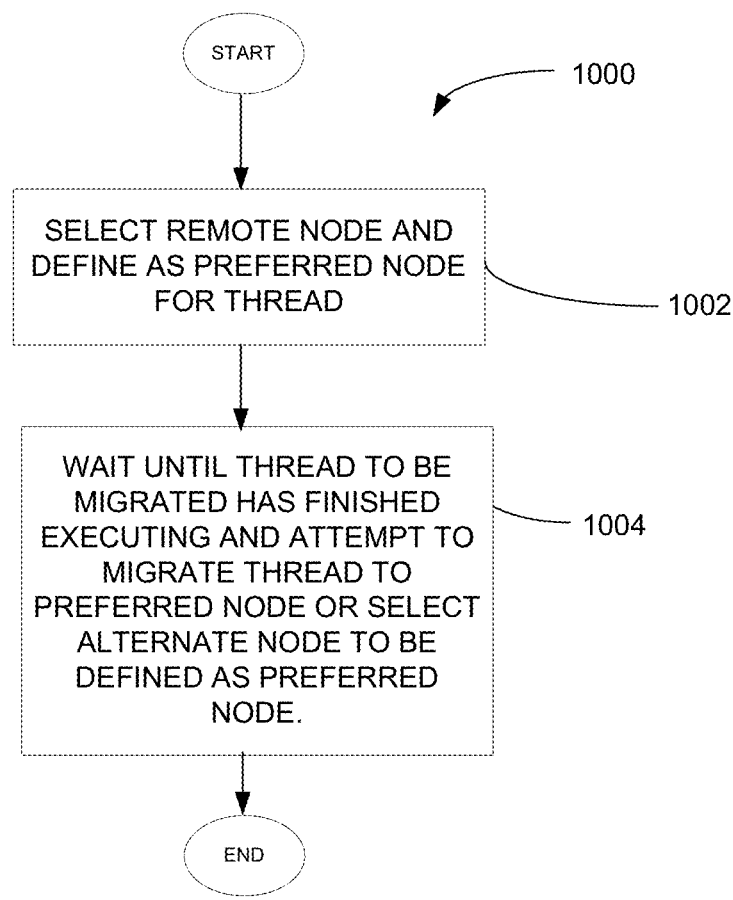
FIG. 10 is a flowchart representative of example machine readable instructions that may be executed to implement the example scheduler of FIG. 1 to migrate a thread from a home node to a remote node.

Example machine readable instructions 1000 that may be executed to implement the example scheduler 16 of FIG. 1 are represented by the flowchart shown in FIG. 10. The example machine readable instructions 1000 may be executed at intervals (e.g., predetermined intervals), based on an occurrence of an event (e.g., a predetermined event), etc., or any combination thereof. The machine readable instructions 1000 are used to perform a soft migration of a thread selected for migration to a selected remote node and begin when the selected remote node is defined by the example scheduler module 202 as the preferred home node for the thread (block 1002). If the attempt to migrate the thread to the preferred node is unsuccessful, the example scheduler module selects an alternative remote node and defines the alternative remote node as the preferred node (block 1004). Actual migration of the thread occurs before the thread is executed again. The selected alternative node defined to be the preferred home node may be selected from the list of remote nodes associated with the remote memories accessed by the candidate migration thread.

As described above with reference to FIG. 7, the machine readable instructions described with reference to FIG. 8 and FIG. 9 may also be performed, for example, by the example second list generator 224 or by the example scheduler module 202.

In some examples, the computer system 10 can be implemented using a heterogeneous NUMA architecture system that includes a big or a small processor and/or a general purpose processor at the socket level. For example, the system can use have a big processor core having significant speed capabilities in communication with multiple integrated cores ("MICs") that may operate less quickly but consumer less power than the big processor core. Such systems may share a system memory.

Figure 11:
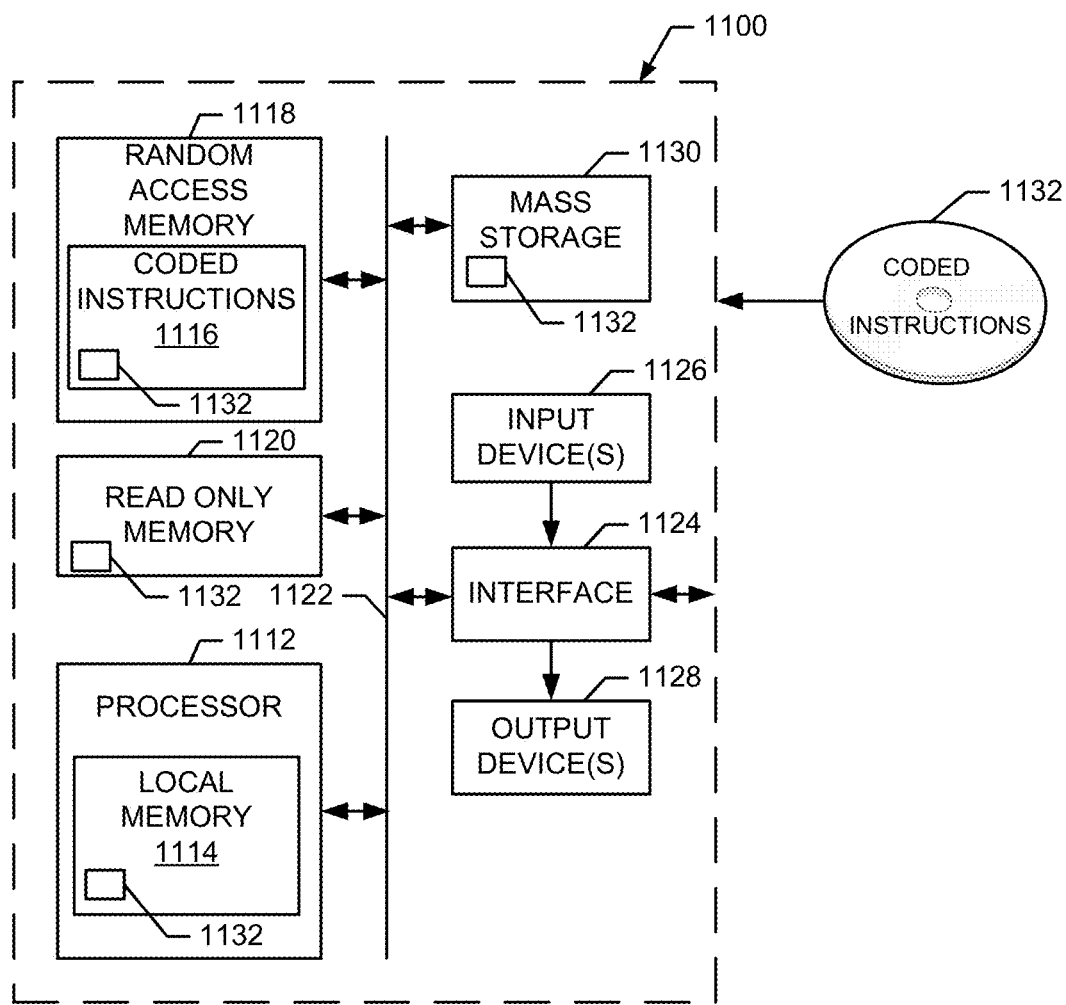
FIG. 11 is a block diagram of an example processing system that may execute the example machine readable instructions of FIGS. 6, 7, 8, 9, and/or 10 to implement the example scheduler of FIG. 1.

FIG. 11 is a block diagram of an example processing system 1100 capable of implementing example apparatus and methods disclosed herein. The processing system 1100 can be, for example, a server, a personal computer, a personal digital assistant (PDA), cell phone, an Internet appliance, or any other type of computing device.

The system 1100 of the instant example includes a processor 1112 such as a general purpose programmable processor. The example processor 1112 includes a local memory 1114, and executes coded instructions 1116 present in the local memory 1114 and/or in another memory device. The example processor 1112 may execute, among other things, the machine readable instructions represented in FIGS. 6-10. The example processor 1112 may be any type of processing unit, such as one or more Intel® microprocessors from the Pentium® family, the Itanium® family and/or the XScale® family, one or more microcontrollers from the ARM® and/or PIC® families of microcontrollers, etc. Of course, other processors from other families and/or manufacturers are also appropriate.

The example processor 1112 is in communication with a main memory including a volatile memory 1118 and a non-volatile memory 1120 via a bus 1122. The volatile memory 1118 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1120 may be implemented by flash memory and/or any other desired type of memory device. Access to the main memory 1118, 1120 is typically controlled by a memory controller (not shown).

The processing system 1100 also includes an interface circuit 1124. The interface circuit 1124 may be implemented by any type of interface standard, such as an Ethernet interface, a universal serial bus (USB), and/or a PCI express interface.

One or more input devices 1126 are connected to the interface circuit 1124. The input device(s) 1126 permit a user to enter data and commands into the example processor 1112. The input device(s) can be implemented by, for example, a keyboard, a mouse, a touchscreen, a track-pad, a trackball, an isopoint and/or a voice recognition system.

One or more output devices 1128 are also connected to the interface circuit 1124. The output devices 1128 can be implemented, for example, by display devices (e.g., a liquid crystal display, a cathode ray tube display (CRT)), by a printer and/or by speakers. The interface circuit 1124, thus, typically includes a graphics driver card.

The interface circuit 1124 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1100 also includes one or more mass storage devices 1130 for storing machine readable instructions and data. Examples of such mass storage devices 1130 include floppy disk drives, hard drive disks, compact disk drives and digital versatile disk (DVD) drives. In some examples, the mass storage device 1130 may implement the memories 14A, 14B, 14C and 14D residing on any of remote nodes, and/or may be used to implement the example thread record data structure 322A for the thread records 322, the example memory intensive thread list data structure 323A for the example memory intensive thread list 323, the node record data structure 342A for the example node records 342, and the example migration candidate data structure 346A for the migration candidate thread list 346. Further one or more of the data structures 322A, 323A, 342A and 346A may be combined in one or more data structures.

The coded instructions 1132 of FIGS. 6-10 may be stored in the mass storage device 1130, in the volatile memory 1118, in the non-volatile memory 1120, in the local memory 1114 and/or on a removable storage medium, such as a CD or DVD 1132.

As an alternative to implementing the methods and/or apparatus described herein in a system such as the processing system of FIG. 11, the methods and/or apparatus described herein may be embedded in a structure such as a processor and/or an ASIC (application specific integrated circuit).

One example method disclosed herein includes sampling a performance metric associated with the execution of a computer program thread on a home node of a computer system having multiple nodes that executes on a home node, determining whether the performance metric exceeds a threshold value, identifying a remote node associated with a remote memory if the threshold value is exceeded, and identifying the computer program thread as a candidate for migration from the home node to the remote node if the threshold value is exceeded. In some examples, the remote memory is accessed by the computer program thread. In some examples, the performance metric is based on memory accesses associated with the execution of the computer program thread or power consumption associated with the execution of the computer program thread. In some examples, one or more of the nodes of the computer system operate on a mobile device.

Other example methods include identifying the remote node as a preferred home node for the computer program thread if the computer program thread has been identified as a candidate for migration, and migrating the computer program thread to the preferred home node based on at least one factor, the factor being the identification of the remote node as the preferred home node. In some example methods the performance metric includes a first memory access metric that is a number of times that the computer program thread experiences an LLCmiss, a second memory access metric that is a number of times that the computer program thread accesses the remote memory, or a third memory access metric that is the number of times that the computer program thread accesses a local memory that is associated with the home node. In still other example methods the performance metric is a ratio of the second memory access metric to the third memory access metric. Example threshold values can include a first threshold value associated with the first memory access metric, a second threshold value associated with the second memory access metric; a third threshold value associated with the third memory access metric; and a fourth threshold value associated with the ratio. The example methods can also include, if the threshold value is exceeded, capturing thread identifying information that includes an identity of the computer program thread and an identity of a processor executing the computer program thread, and determining an identity of the home node using the thread identifying information.

Some example methods include determining that the computer program thread is memory intensive if the threshold value is exceeded, monitoring an amount of time that the first computer program thread is memory intensive, and determining that the computer program thread is persistently memory intensive if the amount of time exceeds a threshold duration of time. An identity of the remote memory can used to determine an identity of the remote node in some example methods.

In some example methods, the threshold is a first threshold, and identifying the computer program thread as a candidate for migration is based on determining that the computer program thread exceeds the first threshold value for a duration of time that exceeds a second threshold value.

In some of the examples disclosed herein an apparatus is used to identify a computer program thread executing on a home node as a candidate for migration from the home node to a remote node and the apparatus can include a first data collector to collect a performance metric value associated with the execution of a computer program thread on a home node of a computer system having multiple nodes, a first monitor to determine whether the performance metric exceeds a threshold value, a second data collector to collect thread identifying information, a thread identifier to use the thread identifying information to determine an identity of the computer program thread, a third data collector to collect load operation information associated with a load operation performed by the computer program thread and a node identifier to use the load operation information to determine an identity of the remote memory, where the node identifier uses the identity of the remote memory to determine an identity of the remote node. Examples apparatuses can also include a second monitor to determine whether the performance metric exceeds the threshold value for a threshold duration of time, and a migration candidate identifier to identify the computer program thread as a candidate for migration from the home node to the remote node based on the determination of the second monitor. In some examples, the performance metric is based on memory accesses associated with the execution of the computer program thread or is based on power consumption associated with the execution of the computer program thread. In some examples, one or more of the nodes of the computer system operate on a mobile device.

In some examples, the apparatus also includes a scheduler module to migrate the computer program thread from the home node to the remote node and in some examples, the performance metric value collected by the apparatus includes one or more of a first memory access metric that is a number of times that the computer program thread experiences an LLCmiss, a second memory access metric that is a number of times that the computer program thread accesses the remote memory, or a third memory access metric that is a number of times that the computer program thread accesses a local memory where the local memory is associated with the home node.

In some examples disclosed herein a tangible machine readable storage medium includes instructions which, when executed, cause a machine to sample a performance metric associated with execution of a computer program thread on a home node of a computer system having multiple nodes, determine whether the performance metric exceeds a threshold value, identifying a remote node associated with a remote memory accessed by the computer program thread if the threshold value is exceeded and identifying the computer program thread as a candidate for migration from the home node to the remote node. In some examples, the performance metric is based on memory accesses associated with the execution of the computer program thread or is based on power consumption associated with the execution of the computer program thread. In some examples, one or more of the nodes of the computer system operate on a mobile device.

In some examples, the instructions also cause the machine to identify the remote node as a preferred home node for the computer program thread if the computer program thread has been identified as a candidate for migration, and migrate the computer program thread to the preferred home node based on whether the preferred home node has sufficient processing resources. In some examples, the performance metric can include one or more of a first memory access metric that is a number of times that the computer program thread experiences an LLCmiss, a second memory access metric that is a number of times that the computer program thread accesses the remote memory and a third memory access metric that is a number of times that the computer program thread accesses a local memory that is associated with the home node. The performance metric can also include a ratio of the second memory access metric to the third memory access metric. In some examples, the threshold value includes at least one of a first threshold value associated with the first memory access metric, a second threshold value associated with the second memory access metric, a third threshold value associated with the third memory access metric, or a fourth threshold value associated with the ratio.

In some examples, the instructions can cause the machine to collect thread identifying information, including an identity of the computer program thread and an identity of a processor executing the computer program thread, if the performance metric exceeds the threshold value and determine an identity of the home node using the thread identifying information. In some examples, the instructions further cause the machine to determine that the computer program thread is memory intensive if the threshold value is exceeded, monitor an amount of time that the first computer program thread is memory intensive, and determine that the computer program thread is persistently memory intensive if the amount of time exceeds a threshold duration of time.

In some example, the instructions can cause the machine to determine that the computer program thread is memory intensive if the threshold value is exceeded, determine that the computer program thread is persistently memory intensive if the computer program thread is memory intensive for a threshold duration of time. In some examples, the determination that the computer program thread is a candidate for migration is based on whether the computer program thread is persistently memory intensive. In some examples, the instructions further cause the machine to determine that the computer program thread is memory intensive if the threshold value is exceeded, monitor an amount of time that the first computer program thread is memory intensive, and determine that the computer program thread is persistently memory intensive if the amount of time exceeds a threshold duration of time.

Finally, although certain example methods, apparatus and articles of manufacture have been described herein, the scope of coverage of this patent is not limited thereto. On the contrary, this patent covers all methods, apparatus and articles of manufacture fairly falling within the scope of the claims of the patent either literally or under the doctrine of equivalents.

The invention claimed is:

1. A method comprising:
    sampling, with a processor, a performance metric associated with execution of a computer program thread on a home node of a computer system, the computer system having multiple nodes including the home node, the computer program thread being a first computer program thread executing on the home node;
    determining whether the performance metric satisfies a threshold value;
    tagging a first set of memory operations from among a randomly selected second set of memory operations, the second set of memory operations being performed by a plurality of computer program threads, including the first program thread, executing on the multiple nodes;
    if the performance metric satisfies the threshold value:
        using memory operation information of the first set of memory operations to identify one of the multiple nodes as being a remote node having a remote memory accessed by the first computer program thread; and
        identifying the first computer program thread as a candidate for migration from the home node to the remote node.

2. A method as defined in claim 1, wherein the performance metric includes at least one of:
    memory accesses executed by the first computer program thread; or
    power consumption associated with the execution of the first computer program thread.

3. A method as defined in claim 1, wherein one or more of the nodes of the computer system is a mobile device.

4. A method as defined in claim 1, further including:
    if the first computer program thread has been identified as a candidate for migration, identifying the remote node as a preferred home node for the first computer program thread; and
    migrating the first computer program thread to the preferred home node.

5. A method as defined in claim 1, wherein the performance metric includes at least one of:
    a number of times that the first computer program thread experiences a low level cache miss;
    a number of times that the first computer program thread accesses the remote memory; or
    a number of times that the first computer program thread accesses a local memory of the home node.

6. A method as defined in claim 5, wherein the performance metric further includes a ratio of the number of times that the first computer program thread accesses the remote memory to a number of times that the first computer program thread accesses the local memory.

7. A method as defined in claim 6, wherein the threshold value includes:
    a first threshold value indicating the number of times that the first computer program thread experiences the low level cache miss;
    a second threshold value indicating the number of times that the first computer program thread accesses the remote memory;
    a third threshold value indicating the number of times that the first computer program thread accesses the local memory; and
    a fourth threshold value indicating the ratio.

8. A method as defined in claim 1, further including:
    capturing thread identifying information if the performance metric satisfies the threshold value, the thread identifying information including an identity of the first computer program thread and an identity of a processor executing the first computer program thread; and
    determining an identity of the home node using the thread identifying information.

9. A method as defined in claim 1, further including:
    determining that the first computer program thread is memory intensive if the threshold value is satisfied;
    monitoring an amount of time that the first computer program thread is memory intensive; and
    determining that the first computer program thread is persistently memory intensive if the amount of time exceeds a threshold duration of time.

10. A method as defined in claim 1, wherein an identity of the remote memory is used to determine an identity of the remote node.

11. A method as defined in claim 1, wherein the identifying of the first computer program thread as the candidate for migration includes determining that the performance metric satisfies the threshold value for a threshold duration of time.

12. An apparatus comprising:
    a first data collector to sample a performance metric value associated with the execution of a computer program thread on a home node of a computer system, the computer system having a plurality of nodes including the home node;
    a first monitor to determine whether the performance metric satisfies a threshold value;
    a second data collector to collect thread identifying information;
    a thread identifier to use the thread identifying information to determine an identity of the first computer program thread;
    a third data collector to collect memory operation information from a set of randomly tagged memory operations;
    a node identifier to use the memory operation information to determine an identity of a remote memory accessed by the first computer program thread, the node identifier to use the identity of the remote memory to determine, from among the plurality of nodes, an identity of a remote node;
    a second monitor to determine whether the performance metric satisfies the threshold value for a threshold duration of time; and
    a migration candidate identifier to identify the first computer program thread as a candidate for migration from the home node to the remote node responsive to the determination of the second monitor, wherein at least one of the first data collector, the first monitor, the second data collector, the thread identifier, the third data collector, the node identifier, the second monitor and the migration candidate identifier include a processor.

13. An apparatus as defined in claim 12, wherein the performance metric includes at least one of:
    memory accesses by the first computer program thread; or
    power consumption associated with the execution of the first computer program thread.

14. An apparatus as defined in claim 12, wherein one or more of the nodes of the computer system operate on a mobile device.

15. An apparatus as defined in claim 12, further including a scheduler to migrate the first computer program thread from the home node to the remote node.

16. An apparatus as defined in claim 12, wherein the performance metric includes at least one of:
    a number of times that the first computer program thread experiences a low level cache miss;
    a number of times that the first computer program thread accesses the remote memory; or
    a number of times that the first computer program thread accesses a local memory of the home node.

17. A tangible computer readable medium comprising machine readable instructions which, when executed, cause a machine to at least:
    sample a performance metric associated with the execution of a computer program thread on a home node of a computer system, the computer system having a plurality of nodes including the home node, the computer program thread being a first computer program thread of a plurality of computer program threads executing on the plurality of nodes;
    determine whether the performance metric satisfies a threshold value;
    tag a first set of memory operations from among a randomly selected second set of memory operations, the second set of memory operations being performed by the plurality of computer program threads;
    if the performance metric satisfies the threshold value:
        use the tags of the first set of memory operations to identify a remote node from among the plurality of nodes, the remote node having a remote memory accessed by the first computer program thread; and
        identify the first computer program thread as a candidate for migration from the home node to the remote node.

18. A tangible computer readable medium as defined in claim 17, wherein the performance metric includes at least one of:
    memory accesses by the first computer program thread; or
    power consumption associated with the execution of the first computer program thread.

19. A tangible computer readable medium as defined in claim 17, wherein one or more of the nodes of the computer system operate on a mobile device.

20. A tangible computer readable medium as defined in claim 17, wherein the instructions, when executed, further cause the machine to:
    if the first computer program thread has been identified as a candidate for migration, migrate the first computer program thread to the remote node.

21. A tangible computer readable storage medium as defined claim 17, wherein the performance metric includes at least one of:
    a number of times that the first computer program thread experiences a low level cache miss;
    a number of times that the first computer program thread accesses the remote memory; or
    a number of times that the first computer program thread accesses a local memory of the home node.

22. A tangible computer readable medium as defined in claim 21, wherein the performance metric further includes a ratio of the number of times that the first computer program thread accesses the remote memory to the number of times that the first computer program thread accesses a local memory.

23. A tangible computer readable medium as defined in claim 22, wherein the threshold value includes at least one of:
    a first threshold value indicating the number of times that the first computer program thread experiences the low level cache miss;
    a second threshold value indicating the number of times that the first computer program thread accesses the remote memory;
    a third threshold value indicating the number of times that the first computer program thread accesses the local memory; or
    a fourth threshold value indicating the ratio.

24. A tangible computer readable medium as defined in claim 17, wherein the instructions, when executed, further cause the machine to:
    collect thread identifying information if the performance metric satisfies the threshold value, the thread identifying information including an identity of the first computer program thread and an identity of a processor executing the first computer program thread; and
    use the thread identifying information to determine an identity of the home node.

25. A tangible computer readable medium as defined in claim 17, wherein the instructions, when executed, further cause the machine to:
    determine that the first computer program thread is memory intensive if the performance metric satisfies the threshold value;
    monitor an amount of time that the first computer program thread is memory intensive; and
    determine that the first computer program thread is persistently memory intensive if the amount of time exceeds a threshold duration of time.

\* \* \* \* \*